United States Patent
Friedel et al.

(10) Patent No.: US 9,566,726 B2
(45) Date of Patent: Feb. 14, 2017

(54) MATERIALS HANDLING SYSTEM, STRIATED PATTERNED PRODUCT, AND PROCESS OF FORMING A PATTERNED PRODUCT

(75) Inventors: Randy A. Friedel, Willow Street, PA (US); Edwin George Milovich, Lebanon, PA (US); Gregory R. Lovell, Lancaster, PA (US); Paul H. Welch, Flowood, MS (US)

(73) Assignee: AFI Licensing LLC, Lancaster, PA (US)

( * ) Notice: Subject to any disclaimer, the term of this patent is extended or adjusted under 35 U.S.C. 154(b) by 1161 days.

(21) Appl. No.: 13/274,868

(22) Filed: Oct. 17, 2011

(65) Prior Publication Data

US 2013/0095289 A1    Apr. 18, 2013

(51) Int. Cl.
| | | |
|---|---|---|
| B32B 3/10 | (2006.01) |
| B29C 43/24 | (2006.01) |
| B29B 7/00 | (2006.01) |
| B29B 7/44 | (2006.01) |
| B29B 7/56 | (2006.01) |
| B29B 7/60 | (2006.01) |

(52) U.S. Cl.
CPC ............... *B29C 43/24* (2013.01); *B29B 7/007* (2013.01); *B29B 7/44* (2013.01); *B29B 7/56* (2013.01); *B29B 7/606* (2013.01); *Y10T 428/24355* (2015.01); *Y10T 428/24479* (2015.01)

(58) Field of Classification Search
USPC ........................................................ 264/245
See application file for complete search history.

(56) References Cited

U.S. PATENT DOCUMENTS

| | | | | |
|---|---|---|---|---|
| 2,314,062 | A | | 3/1943 | Alvey et al. |
| 2,694,831 | A | * | 11/1954 | Benedict et al. ............... 264/39 |
| 2,917,781 | A | * | 12/1959 | Petry ............................... 264/76 |
| 3,015,356 | A | * | 1/1962 | White et al. .................... 264/76 |
| 3,320,639 | A | * | 5/1967 | Harp ............................ 366/76.3 |
| 4,955,550 | A | * | 9/1990 | Satake et al. ............. 241/101.4 |

FOREIGN PATENT DOCUMENTS

| | | | | |
|---|---|---|---|---|
| EP | 0318170 | A2 | 5/1989 | |
| FR | 2852551 | A1 | 9/2004 | |
| GB | EP 0372860 | A1 | * 6/1990 | ............. C09D 5/032 |

OTHER PUBLICATIONS http://www.loedige.de/en/mischergranulatoren/continuous-ploughshare-mixer-km/ Retrieved Apr. 4, 2016.*

* cited by examiner

*Primary Examiner* — Christopher Polley (57) ABSTRACT

Disclosed is a materials handling system, a patterned product, and process of fabricating a patterned product. The materials handling system includes an agitation portion having one or more agitators, the agitators arranged and disposed to mix colored particles into a substantially uniform distribution. A processing portion includes a receiving portion arranged and disposed to receive the substantially uniform distribution of the colored particles to form a product with a predetermined pattern. The predetermined pattern is a long-grained, striated or jaspe-grained color pattern. The process includes fabricating a product having such a predetermined pattern. The predetermined pattern is through-patterned as to include colors and textures distributed uniformly throughout the thickness of the product.

15 Claims, 7 Drawing Sheets

MATERIALS HANDLING SYSTEM, STRIATED PATTERNED PRODUCT, AND PROCESS OF FORMING A PATTERNED PRODUCT

FIELD OF THE INVENTION

The present invention relates to materials handling systems, products fabricated from materials handling systems, and processes for fabricating products. More specifically, the present invention relates to materials handling systems that produce patterned products.

BACKGROUND OF THE INVENTION

Vinyl and non-vinyl products can include a heterogeneous layer of colored particles or chips. Such flooring products are used in various facilities and applications where performance improvement comes from having the particles or chips extend throughout the thickness of the product. Such through-color flooring products can be formed to have relatively short-grained striated patterns. Through-color products are also used in ceilings, walls, table-tops, countertops, cabinets, or other suitable applications. Other layered flooring products are used where simulations of wood grains, marble, or other natural long-grained striated design patterns are achieved by printing the design patterns onto a thin film layer.

Known layered vinyl flooring products fabricated with a long-grained striated pattern suffer from a drawback of not having desired properties such as through-color and/or through-pattern. This results is an undesirable visual quality of the patterns due to wear over time.

The through-color flooring products suffer from a drawback of having relatively short-grained striated patterns that do not provide users with the desired long-grained simulations of naturally occurring flooring materials. The colored particles or chips used in producing such flooring tend to adhere to each other or settle in clumps when entering the intake of the feeding hopper. The colored particles or chips do not uniformly distribute upon discharge region from the hopper.

A materials handling system, a patterned product, and a process of fabricating such a patterned product that do not suffer from one or more of the above drawbacks would be desirable in the art.

BRIEF DESCRIPTION OF THE INVENTION

According to an embodiment, a materials handling system includes an agitation portion having one or more agitators, the agitators arranged and disposed to mix colored particles into a substantially uniform distribution. A processing portion includes a receiving portion arranged and disposed to receive the substantially uniform distribution of the colored particles to form a product with a predetermined pattern.

According to another embodiment, a process for forming a product includes mixing colored particles into a substantially uniform distribution, receiving the substantially uniform distribution of the colored particles, and forming a product with a predetermined pattern.

According to another embodiment, a product includes colored particles mixed by an agitator into a substantially uniform distribution, and a predetermined pattern.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Provided is a materials handling system, a patterned product, and a process of fabricating a patterned product. Embodiments of the present disclosure permit fabrication of patterned products not previously available, provide substantially equal distribution of a pattern, permit fabrication of products having through-grain and through-color, permit increased visual quality, permits versatility in manufacturing various types of products, and permits versatility in agitating various compositions of varying viscosities, and combinations thereof.

Figure 1:
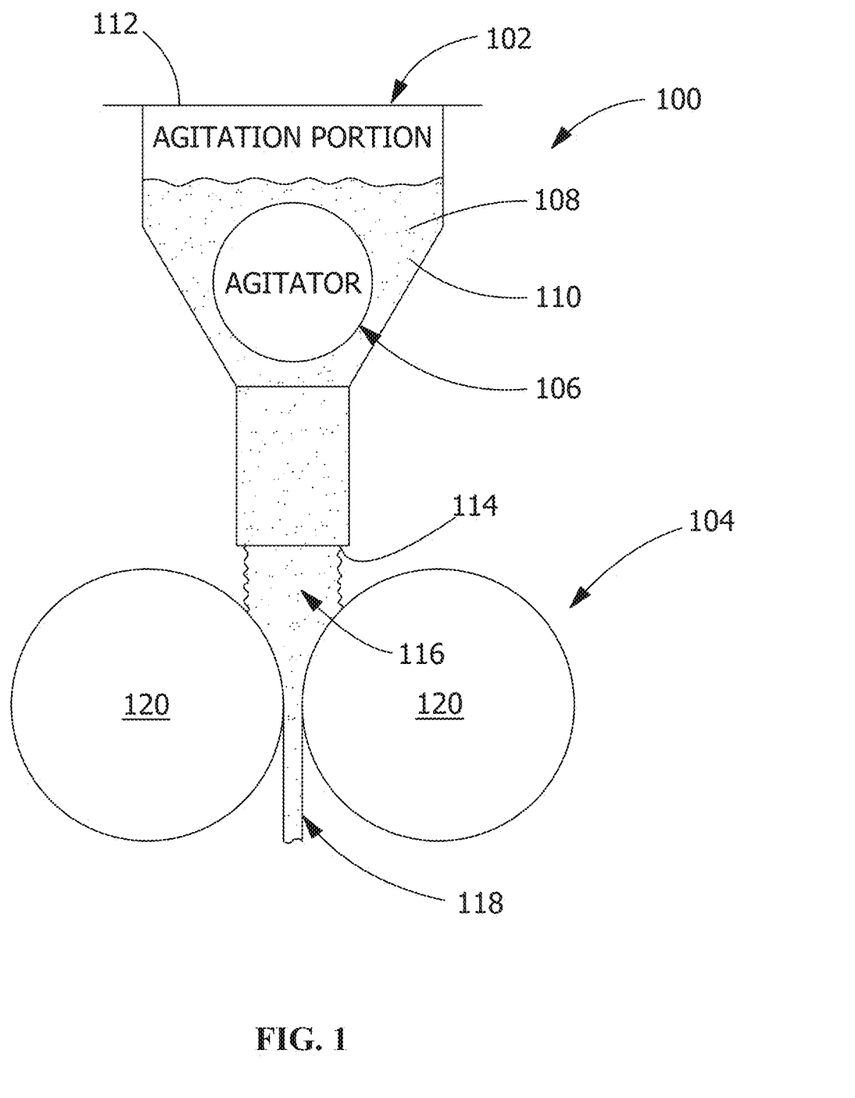
FIG. 1 illustrates a schematic diagram of an exemplary materials handling system having an agitation portion and a processing portion according to an embodiment of the disclosure.

Referring to FIG. 1, in one embodiment, a materials handling system 100 includes an agitation portion 102 and a processing portion 104 arranged and disposed downstream from the agitation portion 102. The agitation portion 102 is a hopper or other suitable container configured for handling a composition 108. The agitation portion 102 includes one or more agitator 106. The agitator 106 is arranged and disposed within the agitation portion 102 to mix the composition 108. In one embodiment, the composition 108 includes colored particles 110 of multiple colors and sizes and one or more of other materials, such as a binder. In one embodiment, the colored particles 110, such as colored chips, are fed into an intake 112 of the agitation portion 102 upstream of the agitator 106, where the colored particles 110 tend to adhere to each other or settle in clumps or clusters when entering the agitation portion 102. The agitator 106 mixes, delumps and breaks up the clusters of colored particles 110 into a substantially uniform distribution within composition 108 for release at a discharge region 114 downstream from the agitator 106. In one embodiment, the composition 108 consists of only colored particles 110. In one embodiment, the composition 108 includes colored particles 110 and other materials (for example, clear particles, liquids, or other fluids). In one embodiment, the composition 108 includes multiple types of materials of different compositions, such as bio-based, fossil fuel based, or geological based materials. In one embodiment, the geological based material includes clay or limestone.

In one embodiment, the colored particles 110 are a maximum of about a ⅛ inch mesh screen size. In one embodiment, the colored particles 110 are a maximum of about a number 8 mesh screen size. In one embodiment, the colored particles 110 are between about a number 12 and about a number 8 mesh, and between about a 1/16 inch and about a ⅛ inch mesh screen size, or any suitable combination or sub-combination thereof.

In one embodiment, the processing portion 104 includes a receiving portion 116, such as a nip. In one embodiment, the receiving portion 116 is arranged and disposed to receive the substantially uniform distribution of the colored particles 110 to form a product 118 with a predetermined pattern (see also FIGS. 6A-B). In one embodiment, the processing portion 104 includes any suitable mechanism, such as two or more calendering rolls 120, to form the product 118. The calendering rolls 120 include further processing features, such as rotating at different speeds and operating at different heating temperatures, to provide the predetermined pattern of the product 118.

Figure 2:
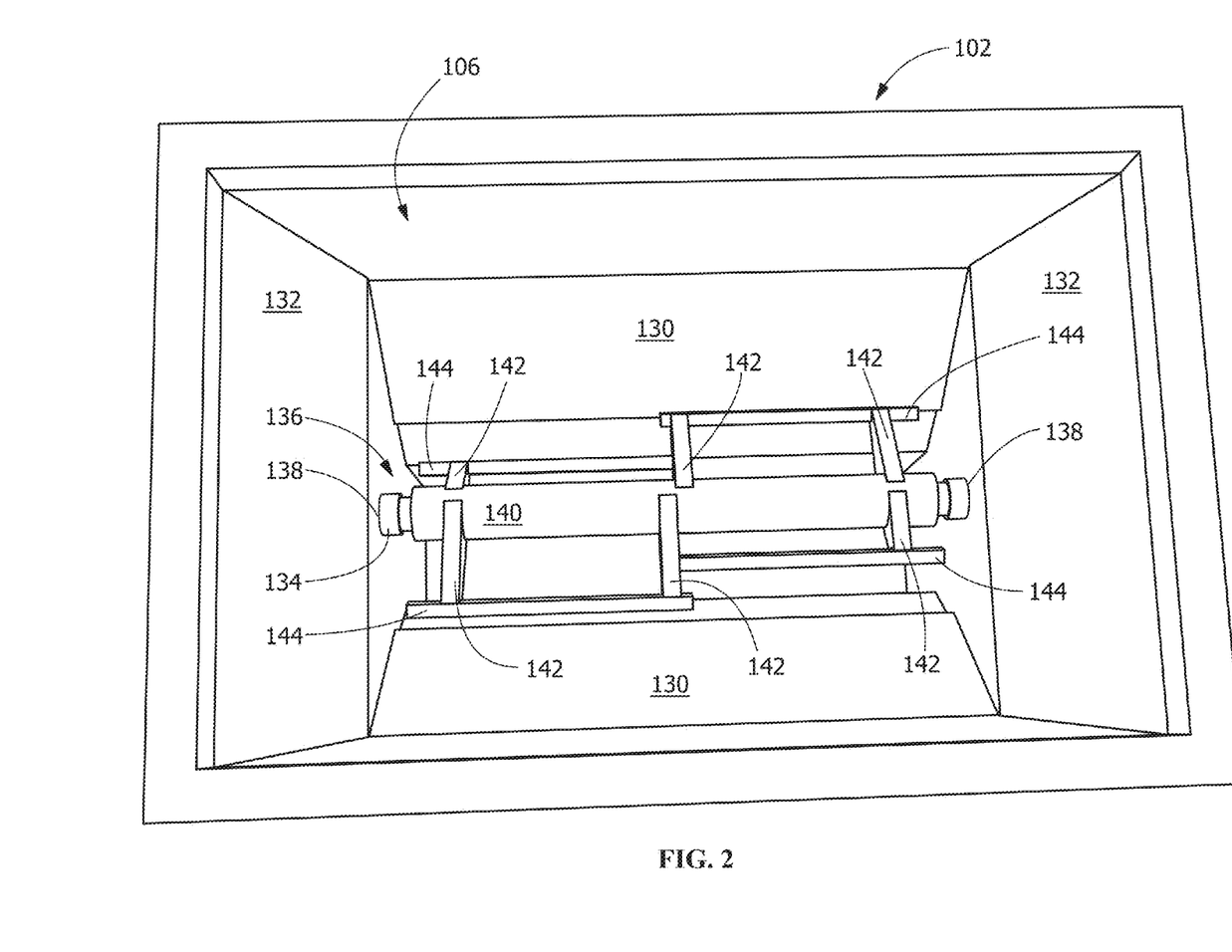
FIG. 2 illustrates a perspective view of an exemplary agitation portion having an agitator according to an embodiment of the disclosure.

Referring to FIG. 2, in one embodiment, the intake 112 of the agitation portion 102 includes two side walls 130 and two end walls 132. In one embodiment, the agitator 106 includes a drive shaft 134 and a paddle assembly 136. The drive shaft 134 is mounted through openings 138 in the end walls 132 to supports (not shown) on the exterior of the end walls 132, and rotated by a drive system (not shown), (for example, motors using chains, or belts and gear boxes) at various speeds as required by various processing applications. In one embodiment, the rotation speed of the drive shaft 134 is a maximum of about 100 rpm. In one embodiment, the rotation speed is a maximum of about 10 rpm. In one embodiment, the rotation speed is between about 10 rpm and about 40 rpm, between about 40 rpm and about 100 rpm, between about 5 rpm and about 50 rpm, between about 10 rpm and about 30 rpm, between about 10 rpm and about 20 rpm, between about 20 rpm and about 40 rpm, or any suitable combination or sub-combination thereof. In one embodiment, the rotation direction of the drive shaft 134 is controlled to run in a first direction, such as clockwise, as facing the agitation portion 102, or a second direction, such as counterclockwise, as facing the agitation portion 102, or the rotation direction follows a sequence of operation that uses a switching device or controls (not shown) to rotate the drive shaft 134 in the first direction for a first predetermined time period, then reverses to rotate in the second direction for a second predetermined time period. In one embodiment, the alternation of rotation direction is controlled in a predetermined switching sequence for the length of the mix cycle. In one embodiment, the rotation of the drive shaft 134 is controlled by speed controls (not shown) to operate at a first speed for a first predetermined time period, then change to rotate at a second speed for a second predetermined time period, or the rotation is controlled by a variable speed drive (not shown). In one embodiment, the rotation of the drive shaft 134 is controlled for a combination of multiple directions, speeds, and time cycles.

In one embodiment, The paddle assembly 136 includes a sleeve 140, two or more arms 142 arranged on and extending from the sleeve 140, and one or more paddles 144 connected to and supported by the arms 142. The sleeve 140 engages the drive shaft 134, thus rotation of the drive shaft 134 rotates the paddle assembly 136. In one embodiment, the paddles 144 are elongate members arranged substantially parallel to the drive shaft 134, and including a square cross-section configured to allow the composition 108 (see FIG. 1) to substantially surround the paddles 144 during the mixing process. In one embodiment, a first paddle 144 is disposed on a first side of the sleeve 140 at a first predetermined distance from the center of the drive shaft 134, and a second paddle 144 is disposed on a second, opposite side of the sleeve 140 at a second predetermined distance from the center of the drive shaft 134, and both paddles 140 extend substantially along one half of the length of the sleeve 140, a third paddle 144 is disposed on the second, opposite side of the sleeve 140 at the first predetermined distance from the center of the drive shaft 134, and a fourth paddle 144 is disposed on the first side of the sleeve 140, at the second predetermined distance from the center of the drive shaft 134, and both paddles extend substantially along the other half of the length of the sleeve 140.

In one embodiment, the paddle assembly 136 includes multiple paddle arrangements or geometries, suitable for mixing and blending colored particles 110. For example, in one embodiment, each paddle 144 extends along substantially the full length of the sleeve 140. In one embodiment, the longitudinal axis of the paddle 144 is arranged at an angle relative to the longitudinal axis of the drive shaft 134, or substantially perpendicular to the axis of the drive shaft 134, or curved in a helical or other curved arrangement, or any suitable combination or sub-combination thereof. The paddle assembly 136 is capable of manufacturing the product 118 from diced chip processes and/or providing the ability to handle a wide range of F-type mix consistencies between product types.

In one embodiment, the paddle 144 include various paddle cross-sections or geometries suitable for mixing and blending colored particles 110. For example, in one embodiment, the cross-section of paddle 144 is circular, oval, semi-circular, substantially planar or blade shaped, or any suitable combination or sub-combination thereof.

Figure 3:
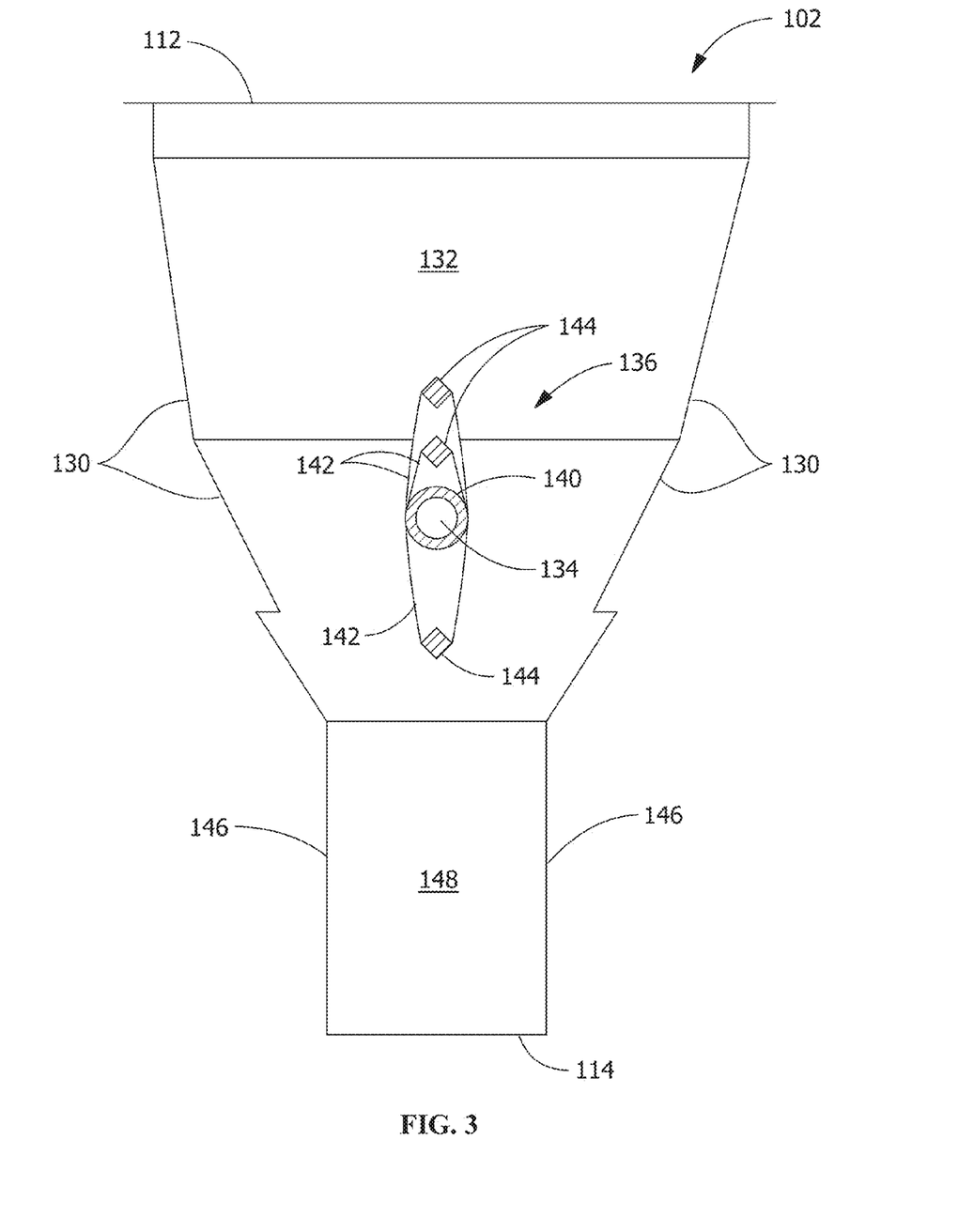
FIG. 3 illustrates a section view of an exemplary agitation portion having an agitator according to an embodiment of the disclosure.

Referring to FIG. 3, in one embodiment, the discharge region 114 of the agitation portion 102 includes two side walls 146 and two end walls 148. In one embodiment, the discharge region 114 includes a bypass device (not shown) arranged and disposed within the discharge region 114 to allow use of the processing portion 104 to produce other patterned products that do not require uniformly distribution of the color particles 110 (not shown). In one embodiment, the discharge region 114 includes a valve or metering device (not shown) arranged and disposed within the discharge region 114 to regulate the flow of the composition 108 (not shown).

Figure 6A:
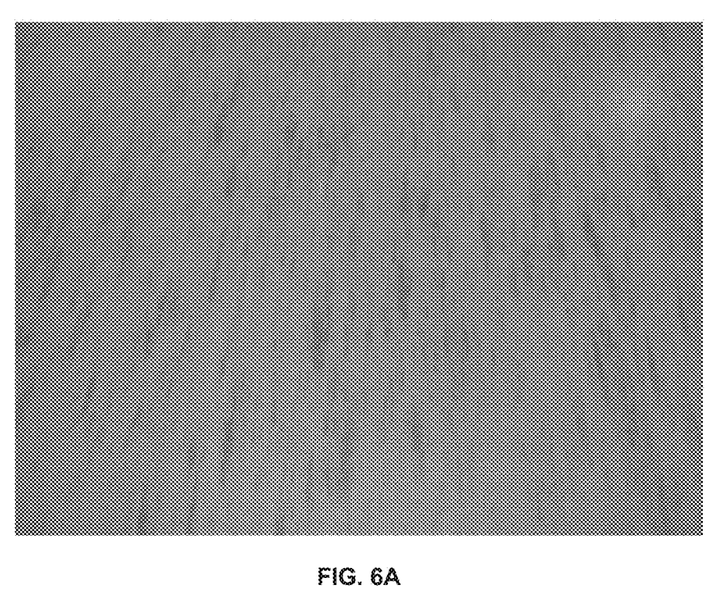
FIGS. 6A-B illustrate top views of example long-grained striated patterned products according to embodiments of the present invention.
Figure 6B:
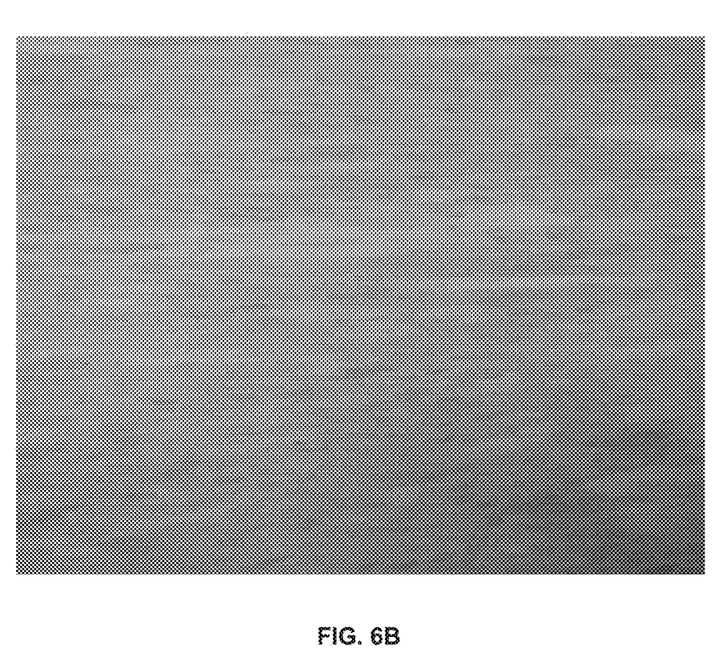
Figure 7:
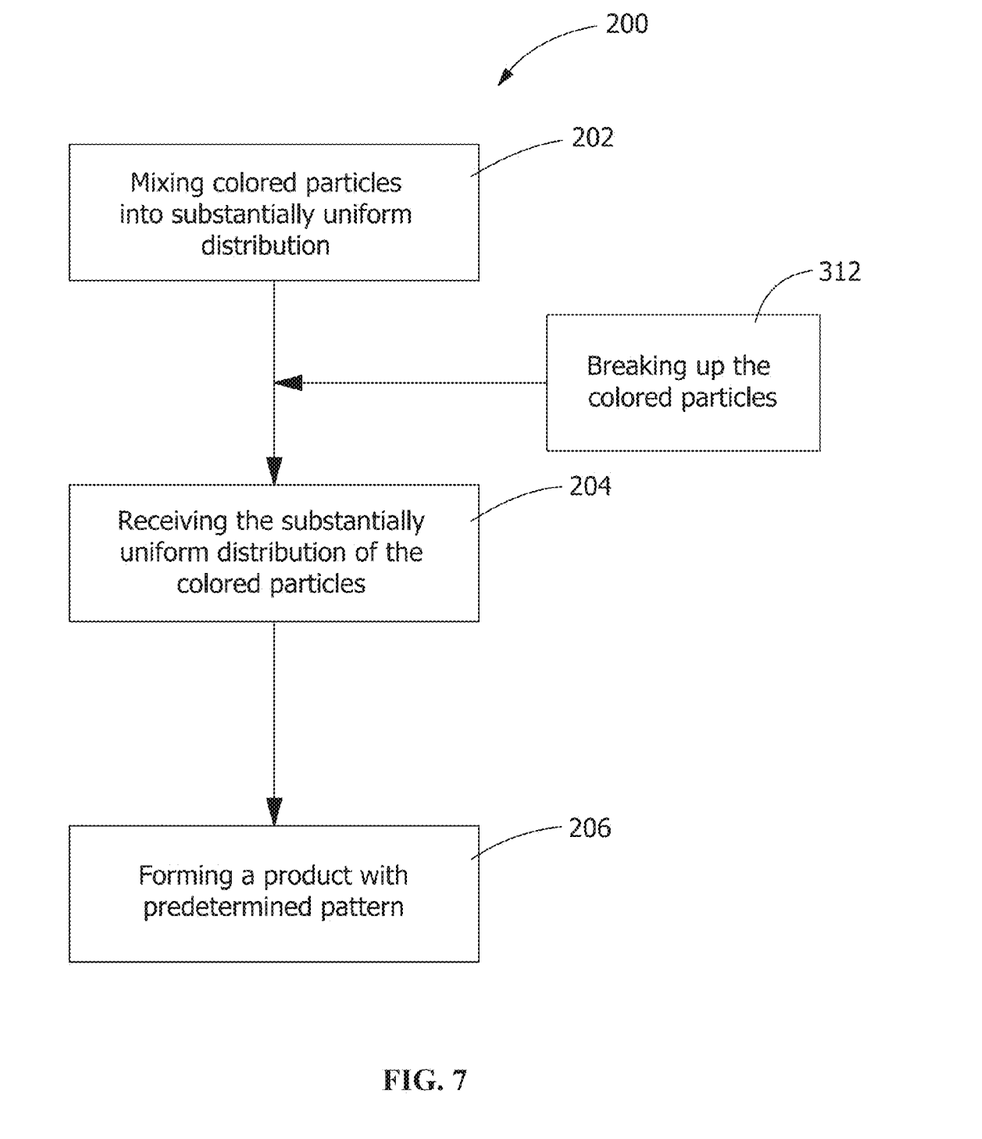
FIG. 7 is a flow chart of an exemplary process of forming a striated patterned product according to an embodiment of the disclosure.

Referring to FIG. 7, in one embodiment, a process 200 of fabricating a product (for example, the product 118 of FIGS. 1 and 6A-B). The process 200 includes mixing colored particles into a substantially uniform distribution (step 202), for example, by rotating the agitator 106. Next, the process 200 includes receiving the substantially uniform distribution of the colored particles 110 (step 204), for example, in the nip or receiving portion 116, and forming a product 118 with a predetermined pattern (step 206), for example, by use of calendering rolls 120. In one embodiment, the predetermined pattern formed is a long-grained, striated or jaspegrained color pattern. In a further embodiment, the process 200 includes further breaking up the colored particles 110 (step 312), for example, by passing through a grid 150 downstream from the agitator 106. As will be appreciated, the process 200 includes any other suitable steps for forming the features described above. The process 200 permits fabrication of products having the feature of through-color and/or through-pattern, thereby maintaining the visual quality of the patterned product as the surface of the product wears away over time.

Figure 4:
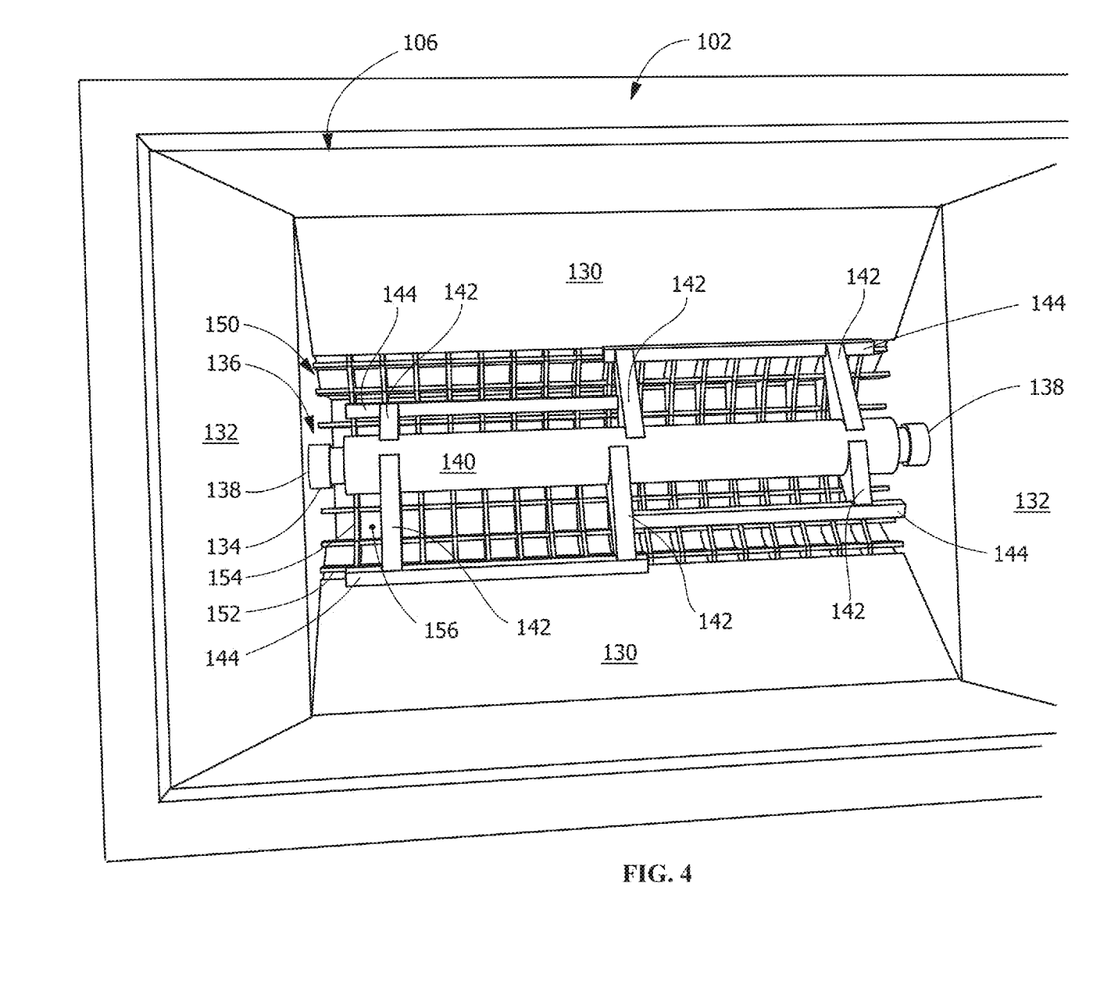
FIG. 4 illustrates a perspective view of another exemplary agitation portion having an agitator and grid according to an embodiment of the disclosure.
Figure 5:
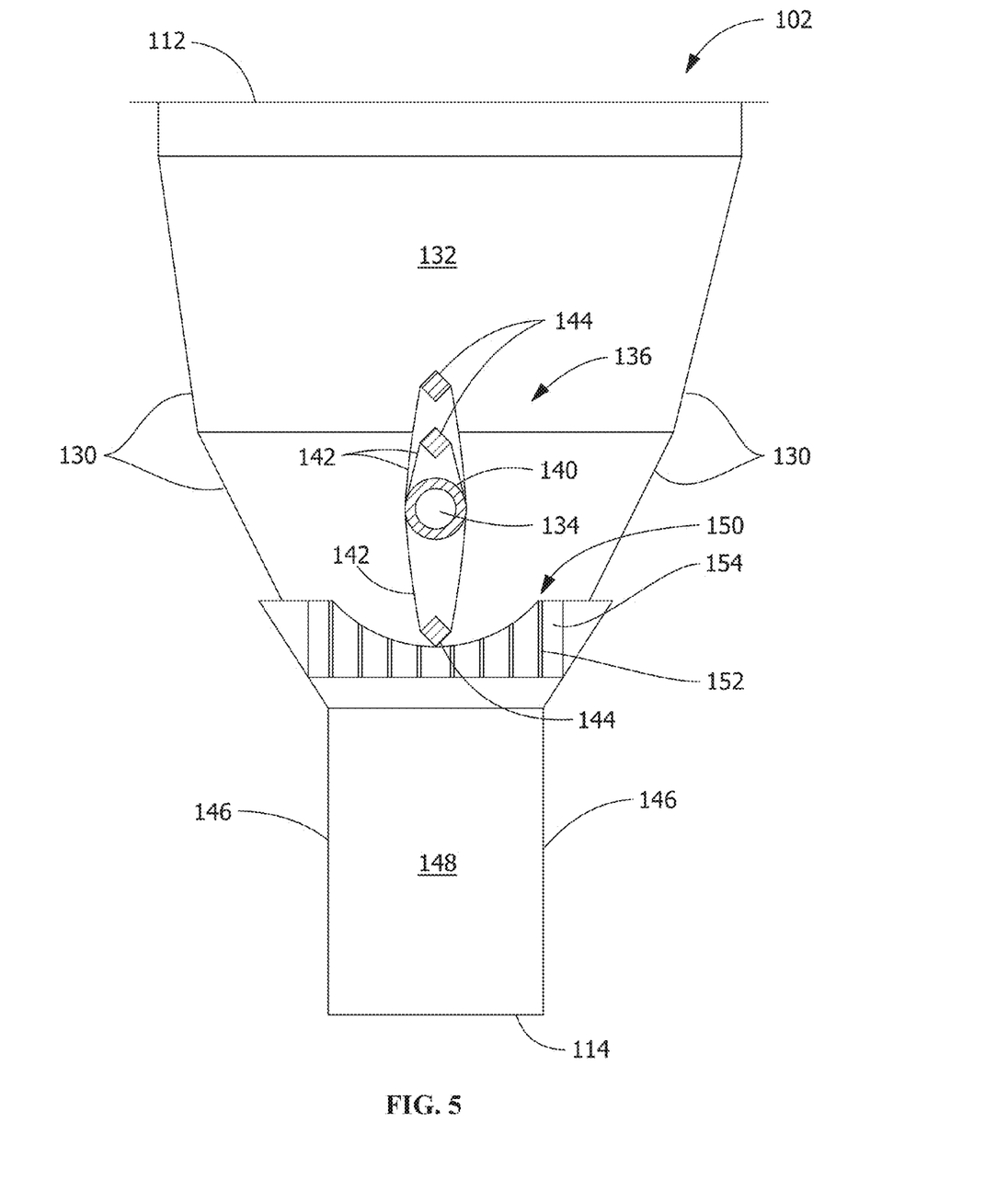
FIG. 5 illustrates a section view of another exemplary agitation portion having an agitator and grid according to an embodiment of the disclosure.

Referring to FIGS. 4 and 5, in one embodiment, the agitation portion 102 includes a grid 150 arranged and disposed downstream of agitator 106. In one embodiment, the grid 150 includes elongate members 152 arranged substantially parallel to the side walls 130, and bracing members 154 arranged substantially parallel to the end walls 132. In one embodiment, the elongate members 152 and the bracing members 154 are arranged at an angle with respect to the side walls 130 and/or the end walls 132. The elongate members 152 and bracing members 154 are spaced a predetermined distance apart, such that they form substantially equal polygon shaped openings 156 (see FIG. 4) in-between. In one embodiment, the openings 156 are any suitable size to provide various predetermined patterns for various products 118, while providing an impact surface that further acts to break up, delump, and mix the colored particles 110. For example, the openings 156 are about 2.0 inches by about 2.0 inches, between about 2.5 inches and about 1.0 inch, between about 2.5 inches and about 2.0 inches, between about 2.0 inches and about 1.5 inches, between about 1.5 inches and about 1.0 inch, between about 2.0 inches and about 1.5 inches, between about 2.0 inches and about 1.0 inch, or any suitable combination or sub-combination thereof. In one embodiment, the polygon shaped openings 156 include an opening of substantially square shape, a quadrilateral, a parallelogram, and/or a rhombus shaped opening, and the dimensions are measured as linear dimensions taken from the midpoint of each opposing side of the opening 156.

Referring again to FIG. 4, in one embodiment, the upper portion of the grid 150 is configured to coordinate to be substantially adjacent to the path of the outer-most portion of the paddles 144. Thus, the upper portion of the bracing members 154 are configured in a curved radius to coordinate with the path of the outer-most portion of the paddles 144, and the upper portion of the elongate members 152 are arranged, disposed and configured in a curved radius to coordinate with the path of the outer-most portion of the paddles 144.

In one embodiment, the product 118 includes a vinyl composition. Suitable vinyl compositions include, but are not limited to, polyvinylchloride (including copolymers and/or homopolymers), luxury vinyl tile, vinyl compositions of vinyl composition tile, and vinyl compositions of vinyl asbestos tile (or products replacing asbestos). In a further embodiment, the vinyl composition includes one or more plasticizers, one or more stabilizers, one or more binders, one or more fillers, and/or one or more pigments, such as a chloride processing pigment (for example, titanium dioxide). In one embodiment, the plasticizer includes or is a non-phthalate plasticizer. In one embodiment, the binder includes or is any suitable polymeric material. In one embodiment, the product 118 includes bio-based materials (for example, materials having a carbon-14 signature identifying the materials as being from a non-synthetic source), recycled materials (for example, materials capable of being identified as being from a previously used product), renewable materials (for example, materials capable of being decomposed), or combinations thereof.

In one embodiment, the product 118 includes filler at a concentration of, by weight, between about 20% and about 90%, between about 30% and about 80%, between about 40% and about 70%, between about 50% and about 60%, between about 20% and about 30%, between about 30% and about 40%, between about 40% and about 50%, between about 50% and about 60%, between about 60% and about 70%, between about 70% and about 80%, between about 80% and about 90%, at about 20%, at about 30%, at about 40%, at about 50%, or any suitable combination or sub-combination thereof. In one embodiment, the binder includes or is any suitable polymeric material.

Referring to FIGS. 6A-B, in one embodiment, the predetermined pattern of the product 118 is a narrow, long-grained, striated or jaspe-grained color pattern. In one embodiment, the predetermined pattern is variegated or marbleized. In one embodiment, the predetermined pattern includes a majority of long, thin, linear, substantially parallel, mottled color marks, strands, bands or patches. In one embodiment, the color marks are randomly located in the pattern such that the average distance between similarly sized mottled color marks of the predetermined pattern varies. The features "narrow", "thin", "long", and "long-grained" are relative to ratio characteristics of the color marks. In one embodiment, the color mark ratio characteristic includes a first dimension, for example, length, and a second dimension, for example, width, whereby the ratio of the first dimension to the second dimension is about 12 to 1. In one embodiment, the color mark ratio characteristic is about 6 to 1. In one embodiment, the color mark ratio characteristic is between about 6 to 1 and about 12 to 1, or any suitable combination or sub-combination thereof.

In one embodiment, the predetermined pattern is termed "Raffia". In one embodiment, the Raffia pattern is produced in a VCT product. In one embodiment, the Raffia pattern includes a first color group, for example, a lighter colored background, and a second color group, for example, darker colored mottled elongate marks, such that a majority of the darker colored mottled marks include an average width of about ⅛ inches and an average length of at least about 1.5 inches long (see FIGS. 6A and 6B).

The substantially uniform distribution of the colored particles 110 provides the predetermined pattern throughout the thickness of product 118 so that the desired visual pattern remains as the top layer of product is worn away from use over time. In one embodiment, the predetermined pattern is configured to simulate naturally occurring striated patterns, found in organic materials such as glacier rock, marble or wood. The substantially uniform distribution of the colored particles 110 provides for the predetermined pattern colors and textures to be distributed substantially uniformly throughout the thickness of product 118, such that the product 118 is configured to be through-color, through-grained, and meets or exceeds the specification standards for through-pattern Class 2 according to ASTM F 1066 guidelines. In 1995, the American Society for Testing and Measurement (ASTM) provided a definition for 1066 Class 2 through-pattern tile as "either the pattern and colors on the surface of the tile extend entirely through the thickness of the tile without significant change, or the colors appearing on the surface shall extend throughout the entire thickness of the tile, although the appearance of the pattern created by these colors will change throughout the thickness".

In one embodiment, the predetermined pattern of product 118 is produced by calendering rolls 120. In one embodiment, the predetermined pattern of the product 118 is produced by milling, presses or other additional or alternative mechanisms. In one embodiment, a portion or all of the vinyl composition of the product 118 (for example, the resin(s), the plasticizer(s), and the filler(s)) is blended and mixed, then milled and melt-processed to form the product 118. The melt-processing is by calendering, extruding, continuous mixing, molding, milling, other melt-processes, or a combination thereof. In one embodiment, the processing portion 104 includes suitable mechanisms to provide pre-heating before calendering, additional calendering, subsequent heating, curing, or any suitable combination or sub-combination thereof. In one embodiment, the product 118 includes a backing layer and/or one or more surface layers. In one embodiment, after initial processing, the product 118 is further cooled, and then press die-cut into planks, tiles, or any other suitable product.

As used herein, the phrase "color strands or patches" refers to strands or patches composed of groupings of color micro-fibers of various widths. For example, in one embodiment, micro-fibers are any suitable micro-fibers suspended within a material or arranged by any suitable technique. As used herein, the term "micro-fiber" refers to any fiber having a dimension that is on the order of micrometers ($10^{-6}$ meters). Individually, the micro-fibers are visually indiscernible. For example, in embodiments of the present disclosure, the micro-fibers have a diameter of less than about 1500 micrometers, a diameter of less than about 100 micrometers, a diameter of less than about 50 micrometers, a diameter of less than about 10 micrometers, a diameter range of about 10 micrometers to about 1500 micrometers, a diameter range of about 10 micrometers to about 1000 micrometers, a diameter range of about 20 micrometers to about 500 micrometers, a diameter range of about 50 micrometers to about 500 micrometers, a diameter range of about 100 micrometers to about 500 micrometers, a diameter range of about 20 micrometers to about 400 micrometers, or a diameter range of about 40 micrometers to about 200 micrometers, the diameter being measured over a central 20%, 50%, 80%, or all of the micro-fiber, for example, as measured through image analysis tools coupled with electron microscopy. Additionally or alternatively, in embodiments of the present disclosure, the micro-fibers have dimensional variance of less than 20%, dimensional variance of less than 5%, or dimensional variance of less than 1% over the region of greatest variance.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A process for forming a product, the process comprising:
   simultaneously mixing and breaking colored particles into a uniform distribution with a rotating agitator, the rotating agitator comprising a drive shaft, a first paddle, and a second paddle, the drive shaft rotationally driving the first paddle and the second paddle, and the first paddle having a first outer-most edge positioned at a first radial distance from a rotational axis of the drive shaft and the second paddle having a second outer-most edge positioned at a second radial distance from the rotational axis of the drive shaft, the first radial distance being greater than the second radial distance;
   receiving the uniform distribution of the colored particles; and
   forming a product with a pattern using calendering rolls;
   wherein the pattern is a long-grained, striated, or jaspe-grained color pattern.

2. The process of claim 1, wherein the product comprises a vinyl composition and the colored particles, and the pattern is through-patterned as to include colors and textures distributed uniformly throughout the thickness of the product.

3. The process of claim 1, wherein the rotating agitator breaks the colored particles against an impact surface during rotation.

4. The process of claim 1, wherein the first paddle breaks the colored particles against an impact surface during rotation.

5. The process of claim 1, wherein the first paddle is on an opposite side of the drive shaft from the second paddle.

6. The process of claim 1, wherein each of the first paddle and the second paddle comprises an elongate member arranged parallel to the drive shaft.

7. The process of claim 1, wherein the rotating agitator is part of a hopper.

8. A process for forming a product, the process comprising:
   mixing colored particles into a uniform distribution with a rotating agitator and a grid arranged downstream of the rotating agitator, the rotating agitator comprising a first paddle that breaks the colored particles against the grid during rotation;
   receiving the uniform distribution of the colored particles; and
   forming a product with a pattern using calendering rolls;
   wherein the pattern is a long-grained, striated, or jaspe-grained color pattern.

9. The process of claim 8, wherein the product comprises a vinyl composition and the colored particles, and the pattern is through-patterned as to include colors and textures distributed uniformly throughout the thickness of the product.

10. The process of claim 8, wherein the grid forms a plurality of openings through which the uniform distribution of the colored particles passes.

11. The process of claim 10, wherein each of the plurality of openings of the grid are substantially equal in size.

12. The process of claim 8, wherein the rotating agitator is part of a hopper.

13. A process for forming a product, the process comprising:
   mixing colored particles into a uniform distribution with a rotating agitator and a grid arranged downstream of the rotating agitator, the rotating agitator comprising: a first paddle, wherein the first paddle is rotationally driven by a drive shaft, an outer-most edge of the first paddle defines a path of travel about a rotational axis of the drive shaft, and an upper portion of the grid is contoured to be substantially adjacent to a portion of the path of travel;
   receiving the uniform distribution of the colored particles; and
   forming a product with a pattern using calendering rolls;
   wherein the pattern is a long-grained, striated, or jaspe-grained color pattern.

14. The process of claim 13, wherein the grid comprises elongate members arranged parallel to the rotational axis of the drive shaft and bracing members arranged perpendicular to the drive shaft, the bracing members having an arcuate upper surface substantially adjacent to a portion of the circular path.

15. The process of claim 13, wherein the rotating agitator is part of a hopper.

\* \* \* \* \*